US006448680B1

United States Patent
Akemakou

(10) Patent No.: US 6,448,680 B1
(45) Date of Patent: Sep. 10, 2002

(54) ROTATING ELECTRIC MACHINE WITH PERMANENT MAGNETS AND MAGNETIC RESISTANCE WITH IMPROVED FLUX WEAKENING PROPERTIES

(75) Inventor: Antoine Dokou Akemakou, Vitry-sur-Seine (FR)

(73) Assignee: Valeo Equipements Electriques Moteur, Creteil (FR)

(*) Notice: Subject to any disclaimer, the term of this patent is extended or adjusted under 35 U.S.C. 154(b) by 0 days.

(21) Appl. No.: 09/622,598

(22) PCT Filed: Dec. 17, 1999

(86) PCT No.: PCT/FR99/03180

§ 371 (c)(1),
(2), (4) Date: Oct. 11, 2000

(87) PCT Pub. No.: WO00/38298

PCT Pub. Date: Jun. 29, 2000

(30) Foreign Application Priority Data

Dec. 18, 1998 (FR) .............................. 98 16180

(51) Int. Cl.⁷ .............................. H02K 21/12
(52) U.S. Cl. ..................... 310/156.41; 310/156.47; 310/156.59; 310/156.66; 310/263
(58) Field of Search ................ 310/263, 156.01, 310/156.38, 156.41, 156.43–156.47, 156.48, 156.49, 156.54, 156.59, 156.66, 156.69, 156.71, 168, 171, 156.55, 156.58, 156.64; 320/154.06, 154.26–154.29, 154.31, 154.35, 154.36, 154.45

(56) References Cited

U.S. PATENT DOCUMENTS 3,411,027 A * 11/1968 Rosenberg ................. 310/156
4,933,584 A * 6/1990 Harms et al. ............... 310/162
5,280,209 A * 1/1994 Leupold et al. ............. 310/156
5,631,512 A * 5/1997 Kawabata et al. ........... 310/156
5,767,601 A * 6/1998 Uchiyama ................... 310/190
5,886,440 A * 3/1999 Hasebe et al. .............. 310/156
5,955,807 A * 9/1999 Kajiura et al. .............. 310/156

FOREIGN PATENT DOCUMENTS

EP   0 544 310 A2 *  6/1993
EP   0 834 979 A2 *  4/1998
FR   0 695 018 A1 *  1/1996

OTHER PUBLICATIONS

Xu et al., A New Design Concept of Permanent Magnet Machine for Flux Weakening Operation, IEEE, 1995, pp. 373–378.*

Hiroshi, Abstract of Japanese Patent No. 57186965, Nov. 1982.*

* cited by examiner

*Primary Examiner*—Nestor Ramirez
*Assistant Examiner*—Dang Dinh Le
(74) *Attorney, Agent, or Firm*—Morgan & Finnegan LLP

(57) ABSTRACT

The invention concerns a rotating electric machine which includes a stator equipped with armature coils and a rotor mounted rotating inside the stator. The rotor having a series of magnets with alternating polarities juxtaposed with magnetic parts having magnetic resistance, respectively associated with the magnets. Each assembly of one magnet and one associated magnetic part defining a rotor pole wherein some of the poles have alternately, along a generally tangential direction, a magnet followed by its magnetic part and a magnet preceded by its magnetic part. The invention is applicable to motor vehicle alternators and AC starters.

12 Claims, 3 Drawing Sheets

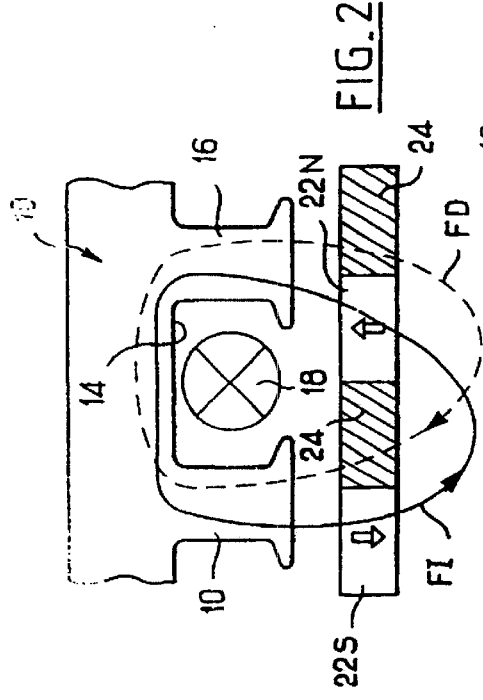
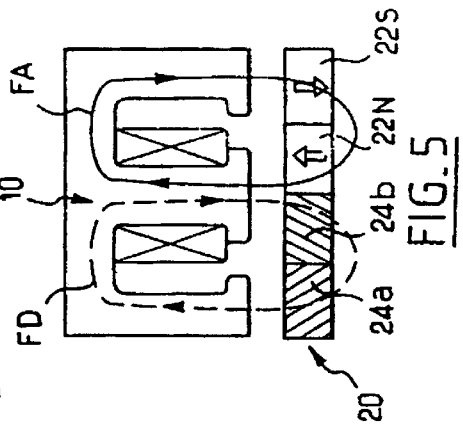
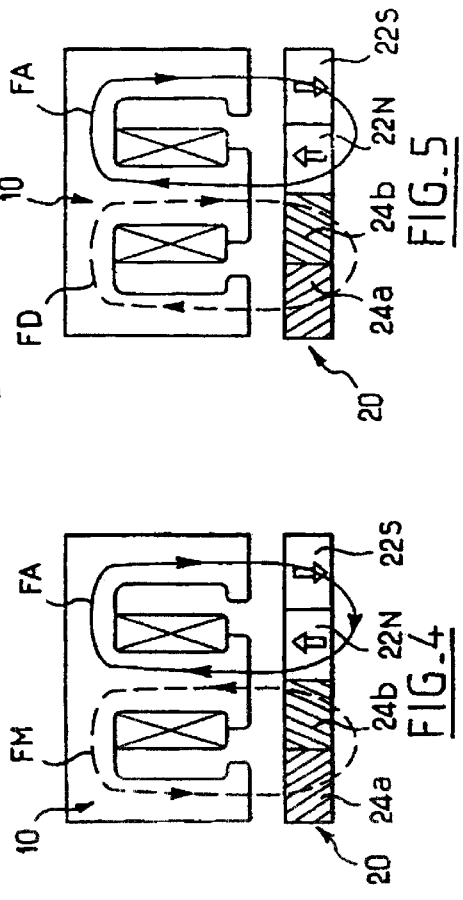
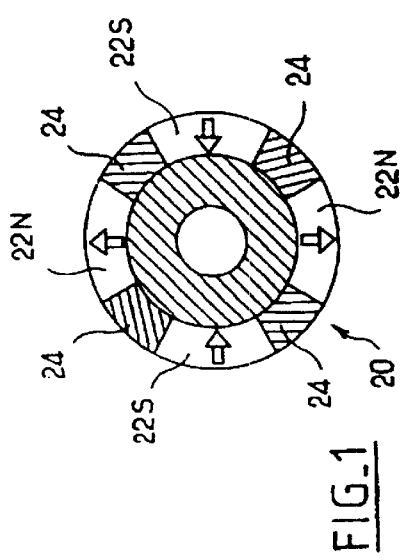
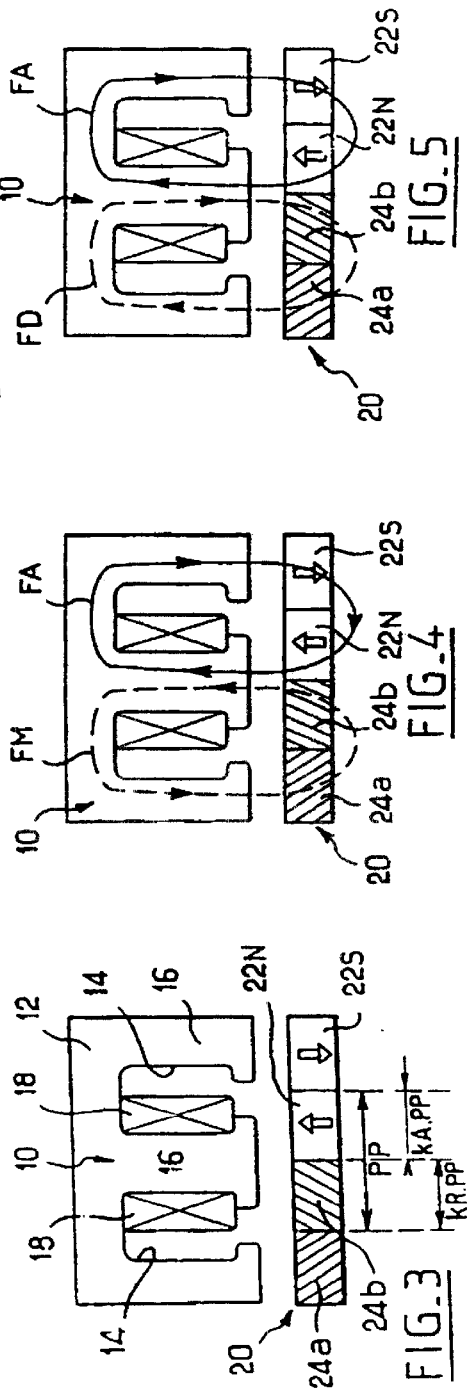

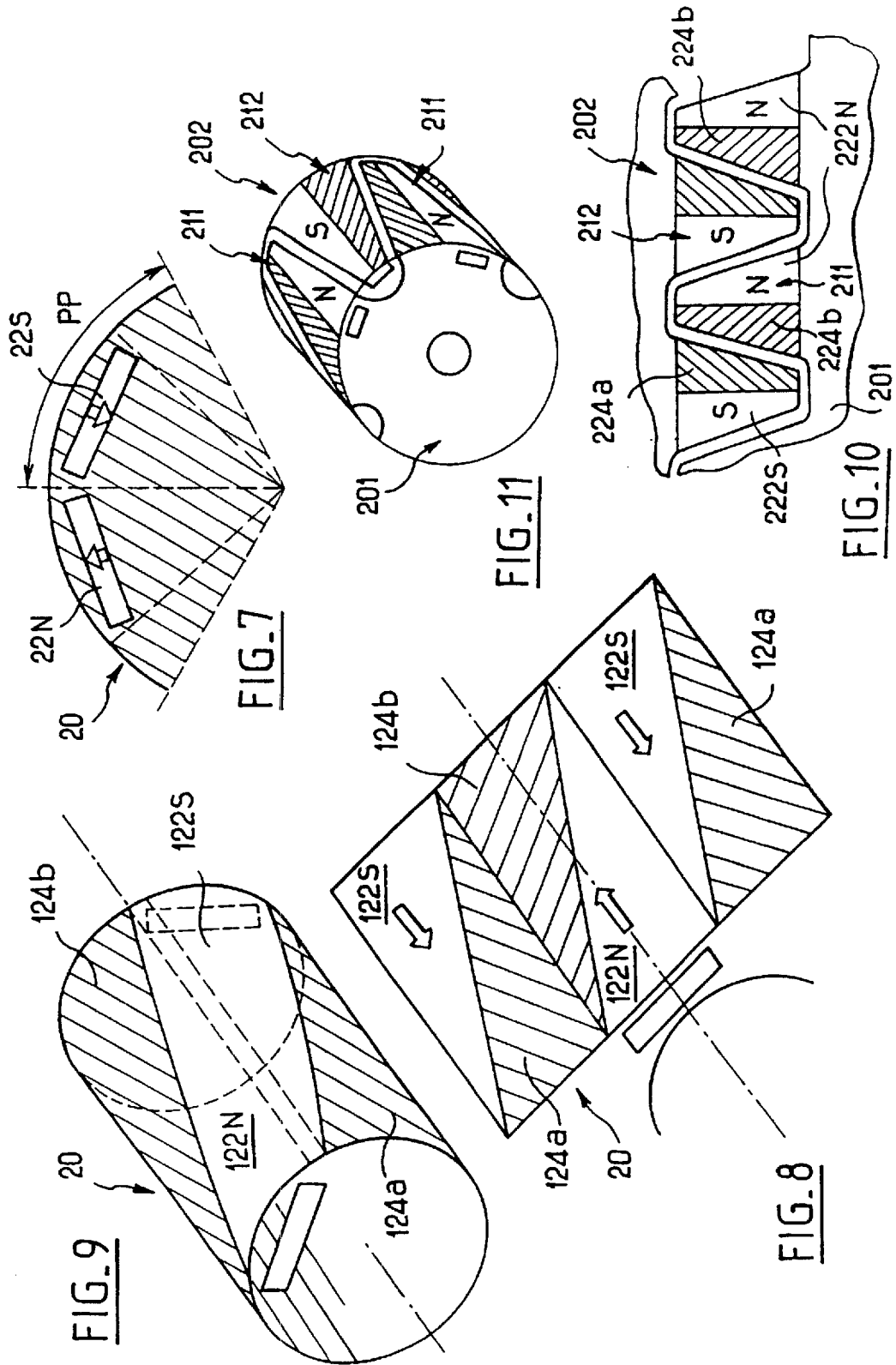

ROTATING ELECTRIC MACHINE WITH PERMANENT MAGNETS AND MAGNETIC RESISTANCE WITH IMPROVED FLUX WEAKENING PROPERTIES

BACKGROUND OF THE INVENTION

The present invention relates generally to rotating electrical machines and in particular to synchronous rotating machines having a permanent magnet rotor.

A rotating machine whose rotor has a series of permanent magnets on the surface of the rotor or buried below the surface of the rotor to define an appropriate distribution of south and north poles is known in the art.

Because a machine of the above kind is permanently excited by the magnets, it is necessary to provide flux weakening arrangements, i.e. means for circulating a flux that does not cooperate magnetically with the stator windings, in particular if the machine is operating under low load conditions.

FIG. 1 shows a prior art solution to this problem with a rotor 20 which comprises magnets 22S defining south poles alternating with magnets 22N defining north poles. The prior art solution consists of placing between the magnets of each pair of adjacent magnets a magnetic flux weakening part 24 adapted to cooperate with the poles of the stator to provide the required flux weakening.

FIG. 2 is a developed view of the rotor cooperating with a stator 10 which has teeth 16 delimited by notches 14 housing stator windings 18. A stator flux FI is created by the magnets and there is an opposite flux weakening flux FD. The figure shows that the stator flux and the flux weakening flux are poorly individualized and it has been found that this partial superposition of the stator and flux weakening fluxes, which are in opposite directions, limits the flux weakening capacity of the machine.

BRIEF SUMMARY OF THE INVENTION

A first object of the present invention is to alleviate this drawback.

Another object of the invention is to reduce the ripple affecting the torque when the machine is operating.

Accordingly, the present invention proposes a rotating electrical machine, in particular an alternator or combined alternator/starter motor for automobile vehicles, comprising a stator equipped with stator windings and a rotor mounted to rotate inside the stator, the rotor having a series of permanent magnets of alternating polarity juxtaposed with variable reluctance magnetic parts associated with respective permanent magnets, each combination of a permanent magnet and an associated magnetic part defining one rotor pole, characterized in that at least some of said poles have alternately, in a generally tangential direction, a permanent magnet followed by its magnetic part and a permanent magnet preceded by its magnetic part.

Preferred but non-limiting features of the rotating machine of the present invention are:

the rotor has, in said generally tangential direction, pairs of adjacent permanent magnets corresponding to poles n and n+1 alternating with pairs of adjacent magnetic parts corresponding to poles n+1 and n+2.

the permanent magnets are radial flux permanent magnets.

the permanent magnets are mounted on the surface of the rotor.

the permanent magnets are buried below the periphery of the rotor.

the permanent magnet and the associated magnetic part in the same pole have similar dimensions in said circumferential direction.

the permanent magnets have a generally triangular shape and two successive permanent magnets are oriented head-to-tail.

the poles of the rotor are defined by interleaved pole claws of two rotor parts.

BRIEF DESCRIPTION OF THE DRAWINGS

Other features, objects and advantages of the present invention will become apparent after reading the following detailed description of various embodiments of the invention, which description is given by way of non-limiting example only and with reference to the accompanying drawings, in which, in addition to FIGS. 1 and 2, already described:

FIG. 3 is a diagrammatic developed view of part of the stator and part of the rotor of a basic first embodiment of a machine according to the present invention, FIG. 4, shows the behavior of the machine shown in FIG. 3 in normal operation, FIG. 5 shows the behavior of the same machine in a flux weakening situation, FIG. 7 is a partial view of the rotor of a variant machine, FIG. 8 is a developed view of the rotor of a second embodiment of a machine according to the invention, FIG. 9 is a perspective view of the rotor corresponding to the FIG. 8 developed view, FIG. 10 is a developed view of the rotor of a third embodiment of a machine according to the invention, and FIG. 11 is a perspective view of the rotor corresponding to the FIG. 10 developed view.

DETAILED DESCRIPTION OF THE INVENTION

Figure 6:
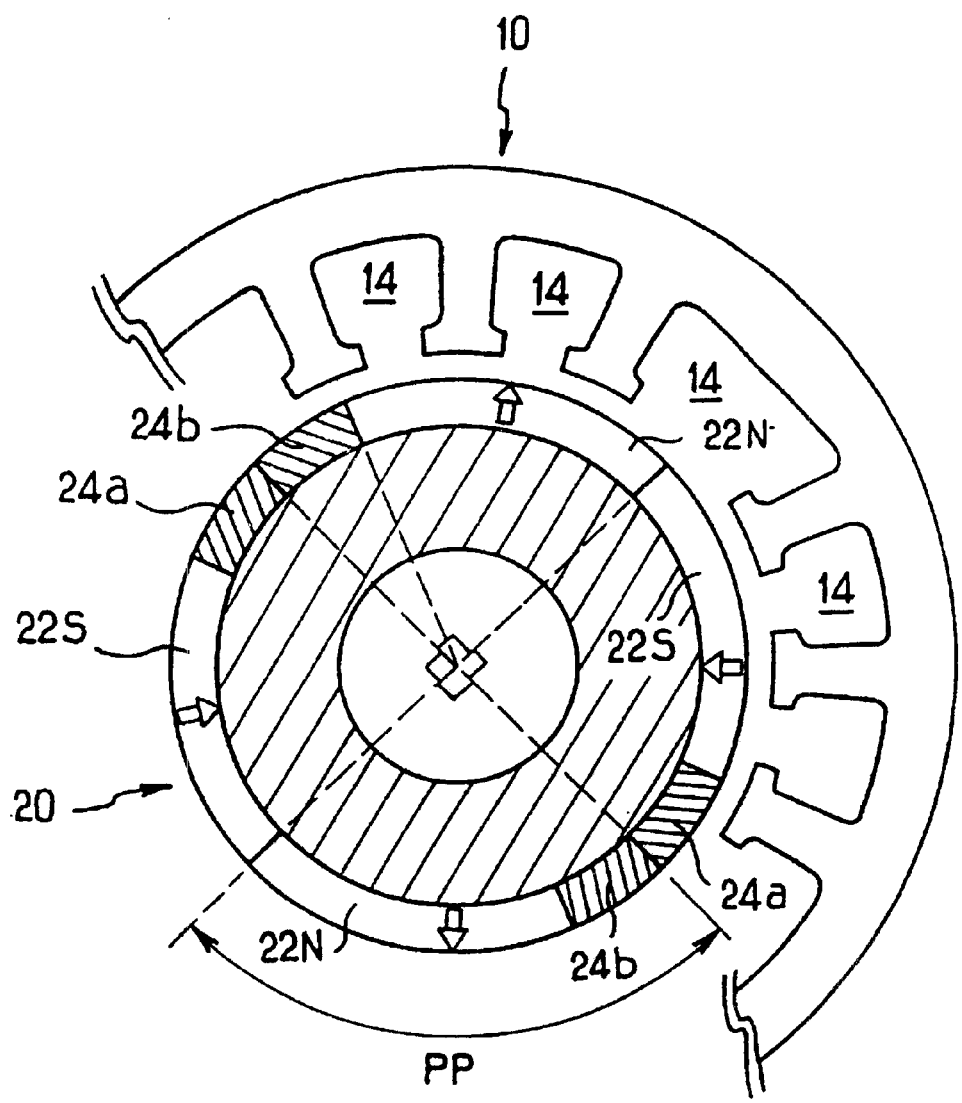
FIG. 6 is a partial view of a rotating machine according to the invention.

FIG. 3 is a diagrammatic developed view of a rotating machine which has an external stator 10 of standard construction whose yoke 12 defines a plurality of notches 14 delimited in pairs by teeth 16 forming poles. The notches 14 house single-phase or multiphase stator windings 18.

The rotor 20 has at its periphery two radial flux permanent magnets 22N and 22S and two variable reluctance magnetic parts 24a and 24b. The two permanent magnets are adjacent each other, as are the magnetic parts 24a and 24b. In practice the periphery of the rotor carries, in succession in the tangential direction, a pair of permanent magnets 22N, 22S, then a pair of magnetic parts 24a, 24b, then another pair of permanent magnets, and so on.

A pole pitch PP of the rotor is defined by the dimension in the tangential direction (which corresponds to the horizontal direction in FIG. 3) of a magnet such as the magnet 22N plus the dimension in the tangential direction of the adjacent magnetic part 24b (north pole). Similarly, another pole pitch of the same magnitude is defined by the cumulative dimensions of a magnet 22S and the adjacent magnetic part 24a (south pole). Clearly, in accordance with the invention, while a given pole consists of the succession in a given tangential direction of a permanent magnet part followed by a variable reluctance flux weakening part, the next pole comprises the succession in the same tangential direction of a variable reluctance part followed by a permanent magnet part.

The relative dimensions of the permanent magnet and the magnetic part within the corresponding pole pitch are represented by coefficients kA and kR which are both less than 1 and such that kA+kR=1.

The flux weakening qualities of the machine are improved by the above rotor structure, and in particular by the side-by-side grouping of the permanent magnets corresponding to two successive poles n and n+1 and the grouping of the magnetic parts corresponding to two successive poles n+1 and n+2. It has also been found that this has the advantage of reducing the ripple affecting the torque when the machine is operating.

In particular, FIG. 4 shows that in normal operation the magnetizing flux FM produced by the stator windings, which here circulates in the same direction as the flux FA created by the permanent magnets in the poles of the stator, is clearly individualized relative to the permanent magnet flux. As a corollary of this, and as shown in FIG. 5, a flux weakening flux FD oriented in the opposite direction to the magnetizing flux shown in FIG. 4 is also individualized relative to the permanent magnet flux FA. In this way, for a given coefficient kR, it is possible to increase the flux weakening flux because the magnet flux does not produce any significant barrier to it.

Note that the coefficients kA and kR are chosen at the design stage to set the flux weakening capacity of the machine. A wide flux weakening range is obtained if kR and kA are similar, i.e. if kA and kR are both around 0.5.

A rotating machine according to the invention has other advantages; in particular, the fact that two permanent magnets can be grouped together in a common notch simplifies the cutting of the laminations that form the yoke of the rotor; also, the magnets 22N and 22S can be made in a single block which is subsequently magnetized in situ to define the magnet 22N which is part of the north pole and the magnet 22S which is part of the south pole.

FIG. 6 shows part of a rotating machine according to the invention which has two pairs of poles. The rotor therefore has at its periphery two pairs of magnets 22N, 22S alternating with two pairs of magnetic parts 24a and 24b.

The stator is a three-phase stator.

Of course, the rotor can have any number of pairs of permanent magnets alternating with magnetic parts.

FIG. 7 shows a variant of the invention in which the magnets 22N and 22S are not on the surface but buried within the yoke of the rotor.

FIGS. 8 and 9 show a rotor having triangular axial flux magnets. To be more precise, a north magnet 122N has the general shape of a right-angled triangle whose longer side is parallel to the rotation axis and whose shorter side is flush with an axial end of the rotor to define a pole. The north magnet 122N and a south magnet 122S are oriented head-to-tail. The longer side of the north magnet 122N is adjacent the longer side of the south magnet 122S whose shorter side defines a pole at the opposite end. Variable reluctance magnetic parts 124a, 124b extend along the hypotenuses of the magnets.

Once again, any number of pairs of magnets 122N, 122S alternating with a corresponding number of pairs of magnetic parts can be provided.

A rotor structure of the above kind is adapted in particular to cooperate with an axial flux overexcitation or de-excitation stator winding.

FIGS. 10 and 11 show the application of the present invention to a claw-pole rotor.

A claw-pole rotor has, in a manner that is conventional in itself, a first part 201 with a first series of generally triangular pole claws 211 and a second part 202 with a second series of generally triangular pole claws 212. The pole claws are interleaved with each other.

In this case, each pole claw 211 of the first series comprises a variable reluctance magnetic part 224b followed in a given tangential direction (from left to right in FIG. 10) by a magnet 222N defining a north pole and each pole claw 212 of the second series has a magnet 222S defining a south pole followed in the same direction by a variable reluctance magnetic part 224a. The structure with magnets and variable reluctance magnetic parts is therefore analogous to that shown in FIGS. 3 to 6.

Of course, the present invention is in no way limited to the embodiment described and shown, to which the skilled person can apply any variant or modification conforming to the spirit of the invention.

In particular, depending on the required flux weakening capacity, the relative dimensions of the permanent magnets and the variable reluctance magnetic parts can be modified, as already mentioned.

The present invention applies in particular to alternators and combined alternator/starter motors for automobile vehicles.

What is claimed is:

1. A rotating electrical machine, in particular an alternator or combined alternator and starter motor for automobile vehicles, comprising a stator equipped with stator windings and a rotor mounted to rotate inside the stator, the rotor having a series of permanent magnets of alternating polarity juxtaposed with a series of variable reluctance magnetic parts, each said magnetic part respectively associated with each permanent magnet, each combination of a permanent magnet and its associated magnetic part defining one rotor pole, wherein at least some of the poles are arranged, in a circumferential direction, as a permanent magnet of one polarity followed by its associated magnetic part, followed by a second magnetic part associated with a second permanent magnet of an opposite polarity, followed by the second permanent magnet of said opposite polarity.

2. A machine according to claim 1, wherein the rotor has, in said circumferential direction, pairs of adjacent permanent magnets of opposite polarity corresponding to poles n and n+1 alternating with pairs of adjacent magnetic parts corresponding to poles n+1 and n+2.

3. A machine according to claim 2, wherein the permanent magnets are radial flux permanent magnets.

4. A machine according to claim 2, wherein the permanent magnet and the associated magnetic part in the same pole have substantially equal dimensions in the circumferential direction.

5. A machine according to claim 2, wherein the poles of the rotor are defined by interleaved pole claws of two rotor parts.

6. A machine according to claim 1, wherein the permanent magnets are radial flux permanent magnets.

7. A machine according to claims 6, wherein the permanent magnets are mounted on the surface of the rotor.

8. A machine according to claim 6, wherein the permanent magnets are buried below the periphery of the rotor.

9. A machine according to claim 1, wherein the permanent magnet and the associated magnetic part in the same pole have substantially equal dimensions in the circumferential direction.

10. A machine according to claim 9, wherein the permanent magnet have a triangular shape and two successive permanent magnets are oriented head-to-tail.

11. A machine according to claim 1, wherein the permanent magnets have a triangular shape and two successive permanent magnets are oriented head-to-tail.

12. A machine according to claim 1 wherein the poles of the rotor are defined by interleaved pole claws of two rotor parts.

* * * * *